(12) United States Patent
Mochizuki et al.

(10) Patent No.: US 6,372,995 B1
(45) Date of Patent: *Apr. 16, 2002

(54) GROMMET

(75) Inventors: Yasunari Mochizuki; Nobutaka Kaneko; Masaji Miyamoto; Hiroki Goto; Shuji Ono, all of Shizuoka; Masao Sakai; Yasuhiko Fujimoto, both of Aichi, all of (JP)

(73) Assignee: Yazaki Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/585,290

(22) Filed: Jun. 2, 2000

(30) Foreign Application Priority Data

Jun. 2, 1999 (JP) .............................. 11-155442
Jan. 11, 2000 (JP) ........................ 2000-002734

(51) Int. Cl.⁷ .............................................. H01B 17/26
(52) U.S. Cl. .............................. 174/152 G; 174/153 G; 174/65 G
(58) Field of Search ......................... 174/152 G, 65 G, 174/72 A, 77 R, 135, 153 G, 151; 16/2.1, 2.5

(56) References Cited

U.S. PATENT DOCUMENTS

| 5,608,191 A | 3/1997 | Teixido ........................ 174/151 |
| 5,856,635 A | * 1/1999 | Fujisawa et al. ......... 174/153 G |
| 6,088,875 A | * 7/2000 | Ono et al. ..................... 16/2.2 |
| 6,211,464 B1 | * 4/2001 | Mochizuki et al. ....... 174/65 G |
| 6,240,597 B1 | * 6/2001 | Mochizuki ..................... 16/2.1 |

FOREIGN PATENT DOCUMENTS

| DE | 798 166 A2 | 10/1997 |
| FR | 2 747 449 | 10/1997 |

* cited by examiner

*Primary Examiner*—Dean A. Reichard
*Assistant Examiner*—W. David Walkenhorst
(74) *Attorney, Agent, or Firm*—Sughrue Mion, PLLC (57) ABSTRACT

In order to insert a wiring harness and to retain it in a mounting hole 12 in a body panel 11, a grommet 10 is so designed that a first cylinder 21 and a second cylinder 22 are connected together via a connector 223, and that a plurality of flanges 25 and guide portions 26 are radially formed. For the grommet 10, when the second cylinder 22 is everted, the flanges 25 are closely attached to the outer face of the first cylinder and are inserted into the mounting hole 12, and do not interfere with the guide portions 26. Then, when reversion of the second cylinder 22 is effected, a groove 24 is fitted into the mounting hole.

11 Claims, 11 Drawing Sheets

GROMMET

BACKGROUND OF INVENTION

1. Field of Invention

The present invention relates to a grommet, and relates in particular to a grommet with which an elongated member, such as a wiring harness, can be securely and easily inserted into and retained at a mounting surface such as a body panel of an automobile.

2. Related Art

Various types of grommets have been proposed that can be used for positioning and securing wiring harnesses that pass through automobile body panels. The present applicant has also proposed such a grommet that comprises: a small-diameter cylinder that is fitted around a longitudinal portion of a wiring harness; a large-diameter cylinder that is fitted into a mounting hole; a tapered cylinder that connects the small-diameter cylinder to the large-diameter cylinder; and a grooved lip and a presser piece that are formed around the outer face of the large-diameter cylinder (conventional art: JP-A-8-212857).

According to this conventional art, the large-diameter cylinder is everted so that its inner face is directed outward, and the circumferential edge of the presser piece is deformed to provide a tapered cylinder for insertion into a mounting hole. Then, when the small-diameter cylinder is in turn inserted into the mounting hole, the force it exerts causes the presser piece and the large-diameter cylinder to return to their original shapes, so that the grooved lip formed around the outer face of the large-diameter cylinder engages the inner edge of the mounting hole opening. As a result, through the application of only a small amount of force the wiring harness can be easily and securely positioned.

According to the conventional art, in order for the grooved lip around the large-diameter cylinder to uniformly engage the inner edge of the mounting hole, a set of tongue shaped pieces longitudinally parallel to the axis of the cylinder must be inserted into the mounting hole.

However, since for this conventional art a structure has not been adopted whereby the individual tongue pieces can be positioned in the center of the mounting hole, the grooved lip may not uniformly engage the inner edge of the mounting hole. A modification to correct this problem is still required.

SUMMARY OF INVENTION

To resolve this problem, it is one objective of the present invention to provide a grommet that can be used to easily position and secure an elongated member, such as a wiring harness, that passes through automobile body panels.

To achieve this objective, according to a first aspect of the invention, a grommet comprises:

a first cylinder through which an elongated member is to be inserted in order to retain the elongated member in a mounting hole that is formed in a mounting surface;

a second cylinder that is connected via an annular connection provided on the outer face of the first cylinder;

a groove-that is formed along the outer face of the second cylinder; and a plurality of flanges that are formed radially, extending from a portion between the groove and the connection at the outer face of the second cylinder, wherein the distal ends of the flanges are collectively tapered by everting the second cylinder so as to direct the inner face toward the exterior, and are inserted into the mounting hole, and wherein by restoring the original shape of the second cylinder the first cylinder is inserted into the mounting hole and the grooved lip engages the inner edge of the mounting hole.

in addition, as is described in the first aspect, to achieve the objective the grommet of the present invention includes a plurality of guide portions that project outward radially from the outer face of the first cylinder, and are inscribed in the circle formed by the inner edge of the mounting hole. Therefore, when the second cylinder is everted, the flanges can be closely attached to the outer face of the first cylinder, without interfering with the individual guide portions.

The first cylinder need only have an inner diameter that corresponds to the outer diameter of an elongated member, such as a wiring harness, or it may have a slightly smaller inner diameter so that it will press tightly against the elongated member therein. For the first cylinder, the same inner diameter or outer diameter need not be continued longitudinally, and the elongated member may be step-shaped or tapered.

The connection need only be projected toward the diameter from an arbitrary position on the outer face of the first cylinder, and be continued in the circumferential direction. The connection may have, for example, a flat ring shape or a substantially conical shape.

The second cylinder need only have an outer diameter that corresponds to the inner diameter of the mounting hole, and its base end may be connected to the circumferential edge of the connection.

Therefore, the first and the second cylinders may be arranged in a nested shape, or may be continuously positioned, via the connection, in the axial direction.

The first and second cylinders and the connection may be integrally formed by using a synthetic resin that is appropriately flexible and waterproof; however, the components may be formed separately so long as sufficient flexibility and water-resistance are provided by the second cylinder.

Furthermore, multiple flanges need only be provided at predetermined equal or unequal intervals around the circumference of the outer face of the second cylinder. For the flanges, an angle relative to the axis of the second cylinder and the distance projected outward from the outer face of the second cylinder may be selected individually, so that when the second cylinder is everted the distal ends of the flanges are fitted between the guide portions and pressed tightly against the outer face of the first cylinder.

When the guide portions are formed they may be given plate-like shapes arranged parallel to the axis of the first cylinder, or plate- or rod-like shapes that are diametrically arranged around the first cylinder. These guide portions may be positioned at equal intervals, or at arbitrarily determined unequal intervals, around the circumference of the first cylinder, so that the distances projected outward correspond to those set for the flanges, and so that the distal ends of the flanges do not interfere with the guide portions.

That is, when the flanges are radially located at intervals of 90 degrees each with the axis of the second cylinder as the center, the guide portions are relatively located at intervals of 90 degrees with the axis of the first cylinder as the center, and with angle phases of 45 degrees relative to the direction in which the flanges are projected.

Since, in the thus structured grommet, multiple guide portions can be inscribed in the mounting hole, so long as the distances the guide portions project are the same, the first cylinder can be so inserted into the mounting hole that its axis matched the axis of the hole. Further, for the grommet, by everting the second cylinder the flanges, which collectively have a cylindrical shape, can be pressed tightly against the outer face of the first cylinder. Therefore, while the condition exists wherein the axis of the first cylinder matches the axis of the mounting hole, the flanges can be inserted into the mounting hole.

That is, in the grommet, so long as the first and the second cylinders are coaxially arranged, and the distances the guide portions are projected are the same, when the first cylinder is inserted into the mounting hole, the flanges, which collectively have a cylindrical shape, can be inserted into the mounting hole, while the axes are automatically matched.

According to a second aspect of the invention, the flanges are projected around a conical face that is extended toward an open end of the first cylinder.

According to the design of this grommet, the flanges are initially inclined toward the open end of the first cylinder. Thus, compared with when the flanges are projected toward the same flat face that is orthogonal relative to the axis of the second cylinder, the flanges can be collectively formed as a tapered cylinder, without the second cylinder being completely everted.

Furthermore, since for this grommet the flanges are initially inclined toward the open end of the first cylinder, compared with when the flanges are projected toward the same flat face, which is an orthogonal projection relative to the axis of the second cylinder, a projection area along the axis of the second cylinder can be reduced.

That is, for this grommet, since the size of the area occupied on the mounting surface can be reduced when the groove engages the inner edge of the mounting hole, the space available in an automobile body can be utilized effectively.

According to a third aspect of the invention, ribs are formed on the faces of the flanges so that they form continuous projections extending from the bases to the distal ends of the flanges.

In this case, one or both of a first flange face that is directed toward the open end of the first cylinder and a second flange face that is directed toward the open end of the second cylinder can be employed as the flange faces.

The ribs formed along the flange faces may be linear or curved, or may have an angular or a closed curve shape. When a plurality of linear ribs are formed, they may be arranged in parallel, or perpendicularly.

These ribs may be formed by cladding or thinning, in the direction of the thickness, flanges having a predetermined thickness.

For the thus structured grommet, if the ribs are formed on the first and the second faces of the flanges, for example, the first flange face contacts the outer face of the first cylinder via the ribs when the second cylinder is everted. And when in this condition the first cylinder is inserted into the mounting hole, the second face contacts the inner edge of the mounting hole via the ribs.

At this time, when the ribs have a pointed cross section the flanges linearly contact the inner face of the second cylinder or the inner edge of the mounting hole. And when the ribs have a rectangular cross section, the faces of the flanges contact the inner face of the second cylinder or the inner edge of the mounting hole.

For the grommet, in order for the second cylinder to revert to its original shape, the faces of the flanges slide along the inner face of the second cylinder or the inner edge of the mounting hole, linearly or belt shaped.

Specifically, in the thus structured grommet, compared with when the faces of the flanges are flat, the resistance encountered as the tapered flanges are inserted into the mounting hole can be reduced. Further, the contact resistance that is generated between the second cylinder and the flange faces when the second cylinder reverts to its original shape can also be reduced. Therefore, the assembly of the wiring harness can be facilitated.

Furthermore, according to a fourth aspect of the invention, a notch is formed between the ribs and the outer face of the second cylinder.

The ribs may be formed, for example, as substantially inverted C shapes or V shapes around the circumference of the flange face. In this case neither end may not be continued on the outer face of the second cylinder.

When, for the grommet of the invention, the ribs are continuously formed on the base ends of the flanges along the outer face of the second cylinder, if to collect the flanges they are bent toward the outer face of the second cylinder, at the ends of the flanges the ribs are contracted and the resistance of the flanges to bending is therefore increased.

Whereas, for the grommet according to the fourth aspect, since a notch is formed between the ribs and the outer face of the second cylinder, compared with when no notch is formed at the pertinent portions, the resistance of the flanges to bending can be reduced, and the assembly of the wiring harness can be facilitated.

According to a fifth aspect of the invention, the guide portions are provided with ridges parallel to the axis of the first cylinder, and when the second cylinder is everted, the distal ends of the flanges can be located inside a virtual cylinder that contacts the ridges.

And when, in the axial direction of the first cylinder, each guide portion has a substantially pointed or a substantially trapezoidally shaped cross section, linear or plane ridges can be provided.

For the thus arranged grommet, since the ridges are formed for the guide portions, the first cylinder can be moved a predetermined distance along the axis, while the axes of the first cylinder and the mounting hole match. Since the distal ends of the flanges are provided inside a virtual cylinder that contacts each ridge, when the first cylinder is moved along the axis, the distal ends of the flanges pass through the mounting hole and reach the reverse side thereof, while the axes of the first cylinder and the mounting hole match.

That is, with this grommet, when, while the second cylinder is everted, the first cylinder is inserted into the mounting hole and is moved a predetermined distance along the axis, the flanges can be inserted into the mounting hole with the axes matched.

According to a sixth aspect of the invention, a plurality of slits formed in the inner face of the second cylinder extend, from radial positions at the open end, parallel to the axis, and continue for a predetermined distance.

A slit may be a simple cut between a pair of walls that come into close contact, or may be a groove having a substantially V-shaped or a substantially U-shaped cross section.

Generally, when a second cylinder having a flat inner face is to be everted, a recessed inner face having a small diameter is deformed and assumed the shape of a convex outer face having a large diameter, i.e., the tension load is imposed across the entire inner face. Therefore, the deformation resistance of the second cylinder is large, and it is difficult to uniformly evert the second cylinder.

However, according to the grommet of the sixth aspect, since slits are formed at radial positions around the inner face of the second cylinder, when the second cylinder is everted the slits are deformed and their cross sections are extended.

That is, with this grommet, as the slits are deformed the tension load, which is imposed across the entire inner face of the second cylinder when it is everted, is dispersed to a plurality of specific positions, and as a result, the total resistance to deformation is reduced. The second cylinder can therefore be uniformly and easily everted.

Generally, for the grommet in the first aspect, an elongated member, such as a wiring harness, is passed through the first cylinder, and is fixed in place when a filler that is injected into the first cylinder solidifies. Then, the second cylinder is everted, so that its inner face is outside, with an arbitrary line at the connection and extending around the circumference acting as a boundary. The resultant grommet is then shipped or stored.

Since the previously mentioned grommet is so designed that a portion of the connection that serves as a boundary is not purposely provided, the second cylinder, for example, may be everted with a line that is inclined relative to the axis of the connection, and during shipping or storage the portion that corresponds to the boundary of the connection may be returned to its initial shape by a flexible reactive force. In this case, before the grommet is attached to a mounting surface, such as an automobile body panel, the second cylinder must again be reversed.

For a grommet according to a seventh aspect of the invention, a thin wall portion is circumferentially formed either on the outer face or on the inner face of the connection.

The thin wall portion can be, for example, a groove that continues around the circumference of the connection, or it may be multiple recessed portions formed at predetermined intervals around the circumference. The groove or the recessed portions that are formed may in cross section have a substantially semi-circular shape, a substantially V shape, a substantially U shape or a substantially rectangular shape, and may be formed in one or both of the outer and the inner faces of the connection.

For the thus structured grommet, since the thin wall portion is formed circumferentially at the connection, when the second cylinder is everted the thin wall portion acts as the boundary.

Therefore, so long as the thin wall portion of the grommet is formed along a face that is perpendicular to the axis of the connection, the reversion of the second cylinder along a line that acts as a boundary and that inclines relative to the axis of the connection can be prevented. Further, since the flexible reactive force exerted by the thin wall portion is weaker than the other portions of the connection, the reversion of the connection to its original shape during shipping or storage can also be suppressed.

According to an eighth aspect of the invention, the thin wall is formed by using a continuing, circumferential groove. Thus, compared with when multiple recessed portions are formed at predetermined intervals around the circumference of the connection, the portion that serves as the boundary of the connection can be precisely determined.

In order to ship or store the grommet of the first aspect with the second cylinder everted, it is preferable that the second cylinder be easily everted, but that it be easily returned to its original shape after it has been attached to the mounting surface.

When the second cylinder is to be everted, or when the everted second cylinder is returned to its original shape, the grommet is deformed so that the connection is extended circumferentially.

That is, when the outer face of the connection is flat, a portion that purposely induces a diameter-extending deformation is not provided at a specific position on the connection.

In this case, in order to evert the second cylinder or to return the everted second cylinder to its original shape, much force is required to push the joint into the mounting hole until a diameter-extending deformation occurs that causes the entire outer face of the connection to be extended circumferentially.

Whereas, according to a ninth aspect of the invention, the grommet includes a plurality of recessed portions that are formed radially toward the generatrix of the outer face of the connection. The recessed portions open widely toward the second cylinder.

The recessed portions can be made thinner than the other portions by forming a step on the outer face of the connection and by flattening the shape of the interior, or the same thickness as that of the other portions can be provided by forming a step on the outer face of the joint and by forming a raised portion on the inner face.

For the thus structured grommet, since multiple recessed portions are formed in the outer face of the connection, a diameter-extending deformation occurs at a specific portion of the connection when the second cylinder is everted, or when the everted second cylinder is returned to its the original shape. Thus, compared with when the outer face of the connection is flat, only a small amount of force is required to push the connection into the mounting hole.

Since the recessed portions of the grommet are formed radially and open widely toward the second cylinder, the diameter-extending deformation of the connection occurs uniformly.

Since the base ends of the flanges function as partial reinforcing members for the connection, it is difficult for a diameter-extending deformation to occur in the portion that corresponds to the base end of each flange of the connection when the second cylinder is everted or when the everted second cylinder is returned to its original shape.

On the other hand, according to a tenth aspect of the invention, since the recessed portions are formed at portions that correspond to the flanges, a diameter-extending deformation that has little effect on the flanges, i.e., a diameter-extending deformation for portions that are easily extended circumferentially, can be further promoted.

When the grommet of the first aspect is shipped or stored while the second cylinder is everted, the groove, which is substantially U-shaped in cross section, is deformed and has a substantially triangular shape with the opposite ridge lines pressed forcibly together. Thus, it is preferable that provisions be made to facilitate the separation of the ridge lines when the grommet is attached to a mounting surface.

Therefore, according to an eleventh aspect, the grommet includes projecting corners and notches that are provided along ridge lines and that are formed by intersecting a side face of the groove that is directed toward the connection and the outer face of the second cylinder. The projected corners and notches are alternately positioned around the circumference of the second cylinder.

A notch can be a conical face that intersects the side of the groove and the outer face of the second cylinder, or a recessed corner formed like a concave step relative to the side of the groove and the outer face of the second cylinder.

A projected corner and a notch need not have the same length in the circumferential direction of the second cylinder; they may have different lengths.

For the thus arranged grommet, projected corners and notches are alternately positioned along the ridges of the groove. Thus, when the grommet is shipped or stored while the second cylinder is everted, even when a groove having a substantially U shape in cross section is deformed and has assumed a substantially rectangular shape in cross section, only the projected corners on a ridge are closely attached to the other ridge, and gaps are provided between the two ridges at the notches.

That is, when this grommet is to be attached to the mounting surface, the ridges of the groove can be separated more easily than they can when notches are not formed in the ridges of the groove.

DETAILED DESCRIPTION OF PREFERRED EMBODIMENTS

The preferred embodiments of the present invention will now be described in detail while referring to the accompanying drawings.

Figure 1:
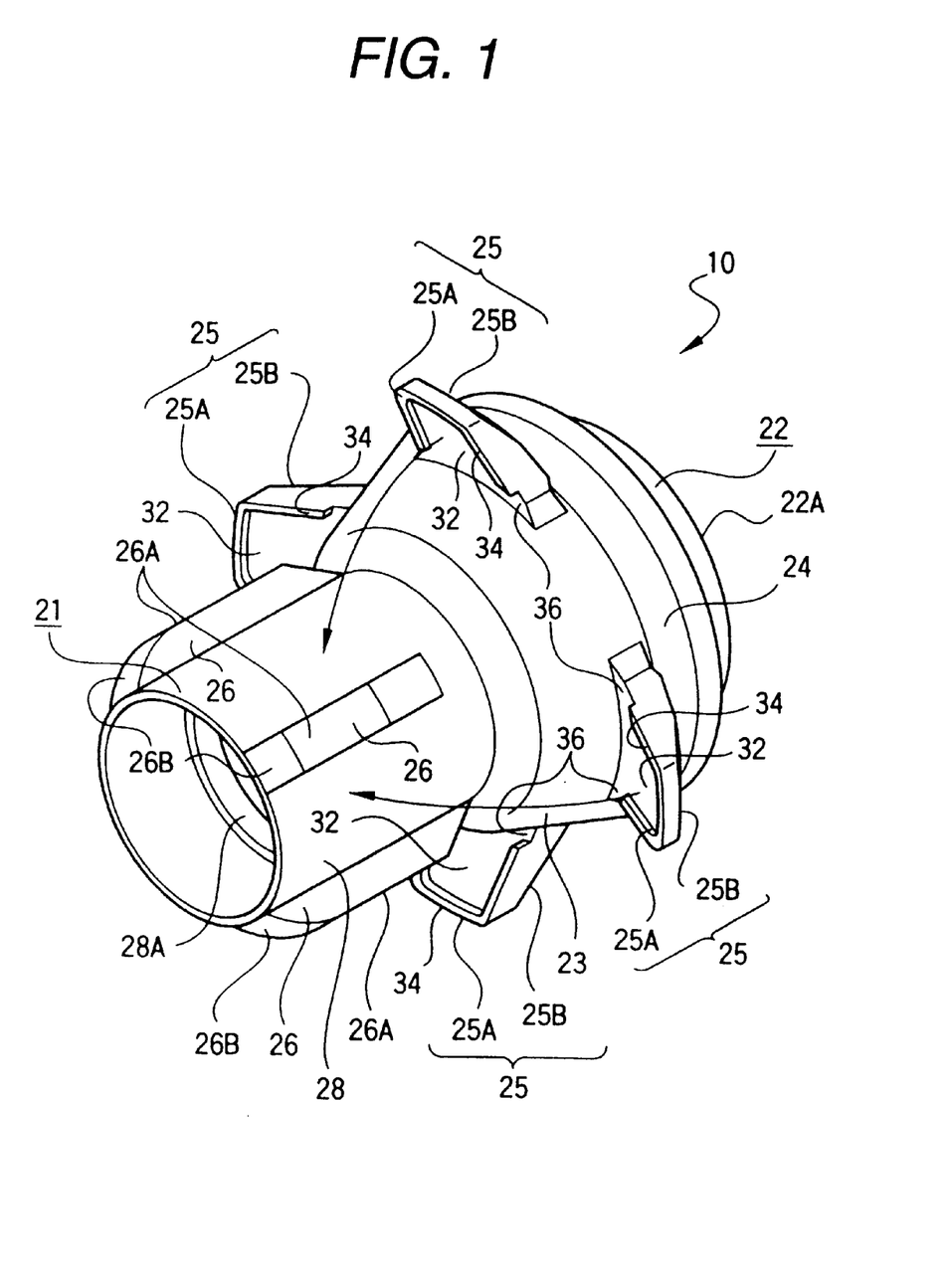
FIG. 1 is a perspective view of a grommet according to a first embodiment of the invention.
Figure 2A:
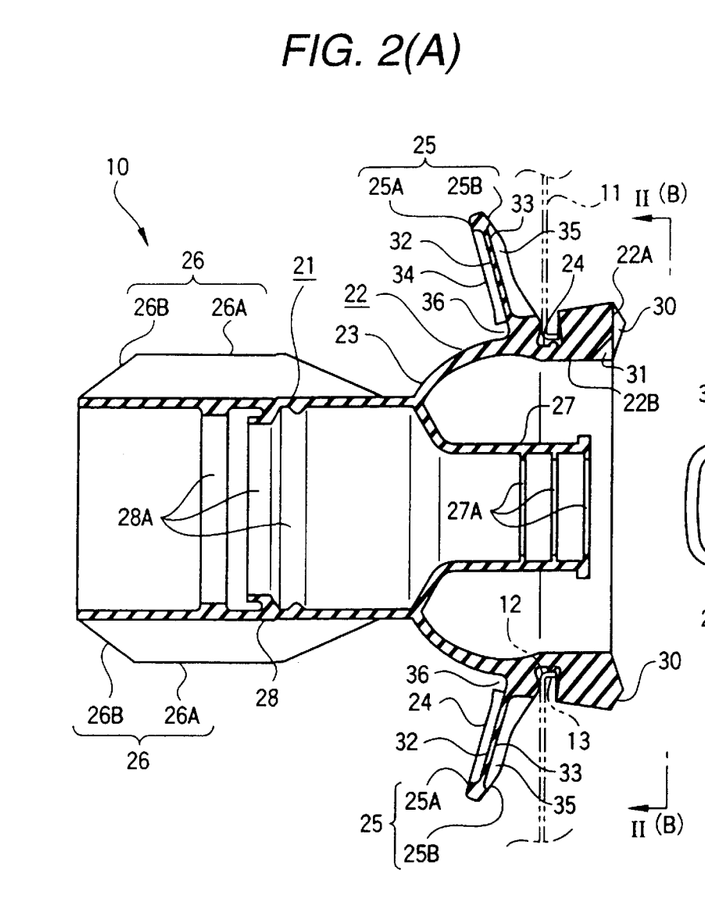
FIGS. 2A and 2B are a cross-sectional view and a plan view of the grommet in FIG. 1.
Figure 2B:
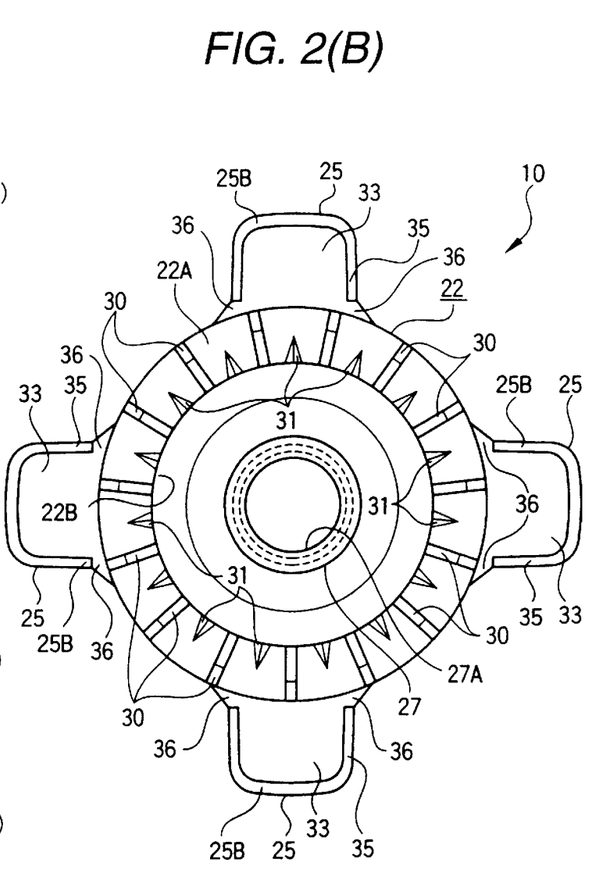

As is shown in FIGS. 1, 2A and 2B, a grommet 10 according to a first embodiment of the invention into which a wiring harness (not shown) is inserted can engage and can be retained in a mounting hole 12 that is formed in a body panel 11 of an automobile, so that the wiring harness passes through the body panel 11. The mounting hole 12 is circular, and a flange 13 having a predetermined height is formed around the edge of the opening.

The grommet 10 comprises: a first cylinder 21, through which the wiring harness is inserted; a ring-shaped connector 23, which is formed around the outer face of the first cylinder 21; a second cylinder 22, which is coaxially connected to the first cylinder 22 via the connector 23; a groove 24, which is formed around the outer face of the second cylinder 22; a plurality of flanges 25, which are formed on the outer face of the second cylinder 22; and a plurality of guide portions 26, which are formed on the outer face of the first cylinder 21. The groove 24 is formed with a substantially inverted-C shape in cross section, so that it can engage the flange 13 of the mounting hole 12, and continues around circumference of the second cylinder 22.

The first cylinder 21, the second cylinder 22, the flanges 25 and the guide portions 26 are integrally formed of a synthetic resin that provides adequate flexibility and water resistance for the thus arranged grommet 10.

The first cylinder 21 has a stepped shape in which a small diameter portion 27 and a large diameter portion 28 are continuously formed coaxially.

The small diameter portion 27 has an inner diameter that corresponds to the outer diameter of the wiring harness, and a plurality of ring-shaped ribs 27A are formed along its inner face.

When the wiring harness is pushed into the small diameter portion 27, and when thereafter a predetermined filler is injected therein and solidifies, the large diameter portion 28 holds the wiring harness and simultaneously maintains an airtight condition.

The connector 23 has a substantially conical shape that opens widely, beginning at the boundary between the small diameter portion 27 and the large diameter portion 28 and continuing to the open end of the small diameter portion 27.

The second cylinder 22 has an outer diameter that corresponds to the size of the opening of the mounting hole 12, and has an inner diameter that is larger than the outer diameter of the small diameter portion 27. The second cylinder 22 is connected to the connector 23, and therefore, the second cylinder 22 is arranged in a substantially nested shape relative to the small diameter portion 27, so that it retains the small diameter portion 27 within a predetermined space.

Figure 3:
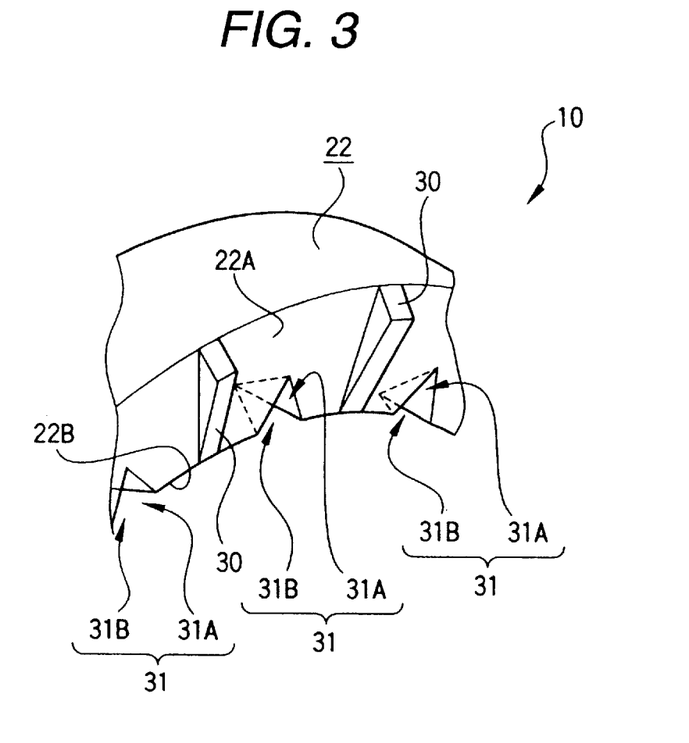
FIG. 3 is an enlarged perspective view of the essential portion that constitutes the end face of a second cylinder.

As is shown in FIG. 3, in the second cylinder 22, multiple raised portions 30 are formed on an end face 22A at the side of the opening, and multiple slits 31 are formed in an inner face 22B.

The raised portions 30 are substantially rectangular plates having a predetermined thickness, and the longitudinal direction is along the end face 22A and along the radial line, with the axis of the second cylinder 22 being employed as a center.

The slits 31 that are located at the radial positions on the open end of the inner face 22B, of the second cylinder 22, each include a substantially V-shaped end opening 31A, which is tapered toward the exterior on the end face 22A of the second cylinder 22, and a substantially V-shaped inner face opening 31B, which tapers toward the first cylinder 21 in the inner face of the second cylinder 22. These slits 31 extend for a predetermined distance parallel to the axis of the inner face 22B of the second cylinder 22.

Referring again to FIGS. 1, 2A and 2B, the flanges 25 are projected outward along a virtual conical face that opens out widely beginning at a point between the groove 24 and the connector 23 and extending to the open end of the first cylinder 21. For the flanges 25, recessed portions 32 are formed in first flange faces 25A that are directed toward the open end of the first cylinder, and recessed portions 33 are formed in second flange faces 25B that are directed toward the open end of the second cylinder 22 (see FIG. 4).

Figure 4:
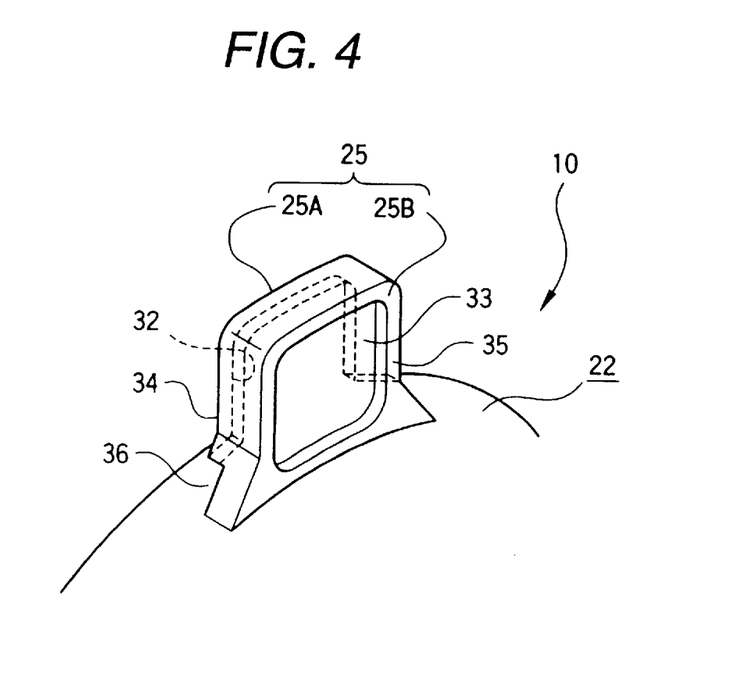
FIG. 4 is an enlarged perspective view of the essential portion of a flange.

Therefore, ribs 34 and 35 are respectively formed for the first flange faces 25A and the second flange faces 25B, and extend along the plane and from the base end to the distal end.

A rib 34 formed on the first flange face 25A has a substantially inverted-C shape in plane and continues along the circumferential edge of the first flange face 25A, with both ends so positioned that there is an interval between them and the outer face of the second cylinder 22. That is, on a flange 25 there is a notch 36 between both ends of the rib 34 and the outer face of the second cylinder 22.

The flanges 25 are located at intervals of 90 degrees around the axis of the first cylinder 21, and are so projected that when the second cylinder 22 is everted, the distal ends of the flanges 25 abut against the outer face of the first cylinder 21.

Referring again to FIGS. 1, 2A and 2B, the guide portions 26 are trapezoid-shaped plates having a predetermined thickness, and each includes a belt-shaped ridge 26A, whose side sectional shape is parallel to the axis of the first cylinder 21, and a chamfered portion 26B, which is inclined toward the axis of the first cylinder 21.

These guide portions 26 are diametrically projected around the first cylinder 21, and in the direction in which the portions 26 are orthogonal to each other. The ridges 26A are extended in the direction leading from the first cylinder 21.

The angle phase of the guide portions 26 at the axis of the first cylinder 21 and the axis of the second cylinder 22 is set at 45 degrees relative to the flanges 25, so that when the second cylinder 22 is everted the guide portions 26 can be closely attached to the outer face of the first cylinder, without any interference by the flanges 25 being encountered (see the arrow in FIG. 1).

The length of the flanges 25 are so set, that when the second cylinder 22 is everted, the distal ends reach positions that correspond to the ridges 26A of the guide portions 26.

An explanation will now be given for the processing for arranging the wiring harness that employs the grommet 10.

The wiring harness is inserted through the first cylinder 21 of the grommet 10, and a predetermined filler is injected into the large diameter portion 28 and solidified.

Figure 5A:
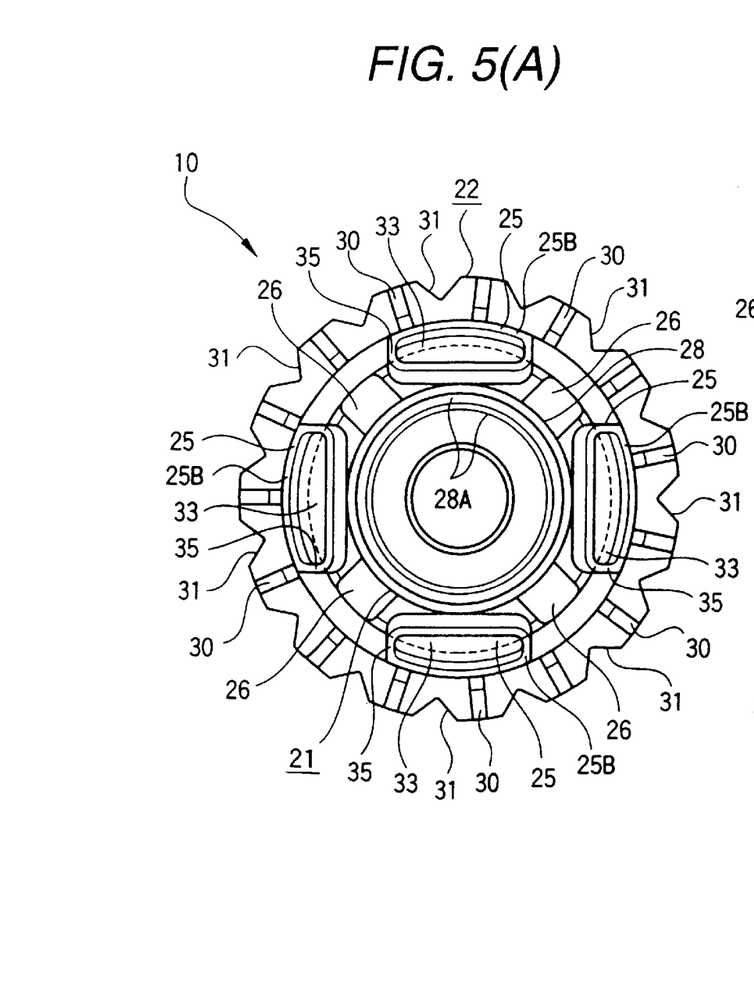
FIGS. 5A and 5B are a plan view and a cross-sectional view for the attachment processing performed with the grommet in FIG. 1.
Figure 5B:
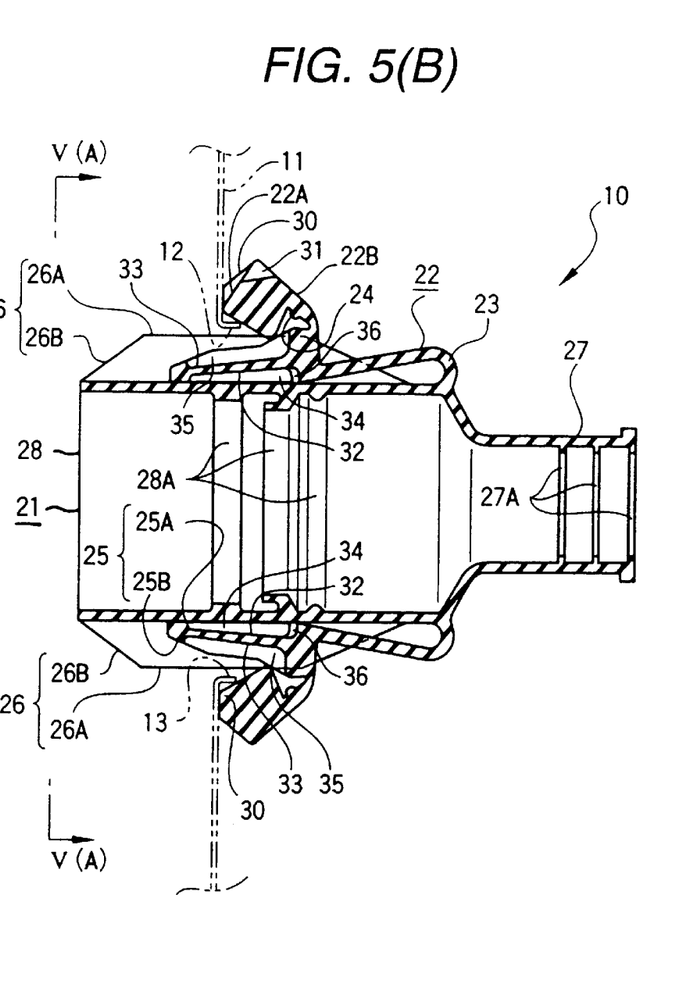

As is shown in FIGS. 5A and 5B, the second cylinder 22 is everted relative to the first cylinder 21 in the vicinity of the connector 23 which serves as a fulcrum, so that the inner face of the second cylinder 22 is on the outside. Thus, the flanges 25 are collectively formed into a tapered cylinder, and the first flange face 25A are closely attached to the outer face of the first cylinder 21.

At this time, since notches 36 are formed between the outer face of the second cylinder 22 and both ends of a rib 34 that is formed on the first flange face 25A, the deformation resistance of each flange 25 can be reduced, compared with when no notches are formed at the pertinent portion.

Further, the distal ends of the flanges 25 can reach positions that correspond to the ridges 26A of the guide portions 26, without interfering with the guide portions 26, and the first flange faces 25A can contact the outer face of the first cylinder 12 via the rib 34.

Since the flanges 25 are projected along a virtual conical face that opens widely at the open end of the first cylinder 21, the flanges 25 can be collectively formed into a tapered cylinder, without the second cylinder 22 being completely everted.

At this time, since the second cylinder 22 is so everted and deformed that the cross sectional shape of each slit 31 is expanded, the tension load imposed on the overall inner face 22B is dispersed to a plurality of specific portions, and as a result, the total deformation resistance is reduced. Thus, the second cylinder 22 can be uniformly and easily everted.

As is shown in FIG. 5B, the first cylinder 21 is inserted through the mounting hole 12; the ridges 26A of the guide portions 26 are inscribed in the mounting hole 12; the end face 22A of the second cylinder 22 is pushed against the surface of the body panel 11 (to the right in FIG. 5B) via multiple raised portions 30; and the groove 24 is deformed and assumes a substantially rectangular shape in cross section.

At this time, since the guide portions 26 are tapered by the chamfered portions 26B, the ridges 26 are so guided that they are inscribed in the mounting hole 12, and relative to the mounting hole 12, the first cylinder 21 is precisely positioned coaxially.

In addition, since the distal ends of the flanges 25 reach the positions that correspond to the ridges 26A of the guide portions 26, the distal ends are automatically inserted into the mounting hole 12, and are positioned so that they face the reverse face of the body panel (to the left in FIG. 5B).

At this time, external force is exerted against the flanges 25 so as to change the projection angle relative to the second cylinder 22.

While the raised portions 30 of the second cylinder 22 contact the surface of the body panel 11, the wiring harness (not shown) is pushed through the body panel 11 to the left in FIG. 5B. Then, the second cylinder 22 is deformed and assumes a substantially U shape in cross section so that it can be returned to its original shape, and the guide portions 26 are extracted from the mounting hole 12.

Since at this time the wiring harness is secured in the first cylinder 21 of the grommet 10 by the filler, the wiring harness will not drop out of the first cylinder 21, even though it is pushed to the left in FIG. 5B.

When the wiring harness is pushed further to the left in FIG. 5B, the raised portions 30 of the second cylinder 22 slide into contact with the body panel 11. Further, while the first flange face 25A and the second flange face 25B of each flange 25 slide in contact with the outer face of the first cylinder 21 and the inner face of the mounting hole 12, the second cylinder 22 begins to be deformed so that the inner face, which originally is the outer face, is everted.

At this time, while the end face 22A of the second cylinder 22 closely contacts the body panel 11, it is held against the body panel 11 by a pressure difference between the inside and the outside of the second cylinder 22, and the eversion of the second cylinder 22 is interfered with.

In the grommet 10, however, since the end face 22A of the second cylinder 22 abuts against the body panel 11 via the raised portions 30, a pressure difference does not occur between the inside and the outside of the second cylinder 22. Further, a sliding resistance relative to the body panel 11 is reduced, so that the second cylinder 22 can be smoothly everted.

In the grommet 10, since the second cylinder 22 is everted, the first flange faces 25A slide via the ribs 34 while contacting the outer face of the first cylinder 21, and the second flange faces 25B slide via the ribs 25 in contact with the inner face of the mounting hole 12. Therefore, the sliding resistance is reduced compared with when the first and the second flange faces 25A and 25B are flat.

Thereafter, the wiring harness is pushed further to the left in FIG. 5B, and when the base ends of the flanges 25 are moved to a position where they have passed through the mounting hole 12, a strong reactive force is released whereby the angle whereat the flanges 25 project from the second cylinder 22 is returned to its initial state.

Therefore, while the flanges 25 are widely opened, the grommet 10 itself is moved to the left in FIG. 5B. Further, while the groove 24 is returned to a substantially inverted-C shape in cross section, the groove 24 engages the flange 13 of the mounting hole 12 (state in FIG. 2A).

According to the grommet 10, the flanges 25 can be closely attached to the outer face of the first cylinder 21 without interfering with the guide portions 26, which can be inscribed in the mounting hole 12. Therefore, the flanges 25 that collectively form a cylindrical shape can be inserted into the mounting hole 12, while the axis of the first cylinder 11 matches the axis of the mounting hole 12.

According to the grommet 10, the flanges 25 are projected along the conical face that is widely opened toward the open end of the first cylinder 21. Thus, compared with when the flanges 25 are projected along the same flat face that is orthogonal to the axis of the second cylinder 22, the flanges 25 can collectively assume the form of a tapered cylinder, without the second cylinder 22 being completely everted.

Furthermore, according to the grommet 10, the flanges 25 are initially inclined toward the open end of the first cylinder 21. Thus, compared with when the flanges 25 are projected along the same flat face that is orthogonal to the axis of the second cylinder 22, the projection area along the axis of the second cylinder 22, i.e., the area of the body panel 11 that is occupied, can be reduced, and the space in an automobile body can be effectively employed.

Further, according to the grommet 10, the ribs 34 and 35 are formed on the first and the second flange faces 25A and 25B of the flanges 25. Thus, it is possible to reduce the insertion resistance caused when the tapered flanges 25 are inserted into the mounting hole 12, or the sliding resistance occurring between the outer face of the second cylinder 22 and the first flange faces 25A when the second cylinder 22 is returned to its initial shape. Therefore, the original shape of the second cylinder 22 can be easily and smoothly recovered.

Especially, since the notches 36 are formed between the outer face of the second cylinder 22 and both ends of the rib 34 that is formed on the first flange face 25A of each flange 25, the deformation resistance of the flanges 25 can be reduced, compared with when the notches 36 are not formed at the specified locations.

According to the grommet 10, since the ridges are formed for the guide portions 26, the first cylinder 21 can be moved axially a predetermined distance, while the axes of the guide portions 26 match the axis of the mounting hole 12. Therefore, the flanges 25 can be inserted into the mounting hole, while the axes are matched automatically.

In addition, for the grommet 10, the slits 31 are formed at radial positions in the inner face 22B of the second cylinder 22 to expand the cross-sectional shape. Therefore, the tension load, which is imposed across the entire inner face 22A of the second cylinder 22 when it is everted, is dispersed to a plurality of specific portions, and therefore, the second cylinder 22 can be uniformly and easily everted.

Figures 6A, 6B, 6C:
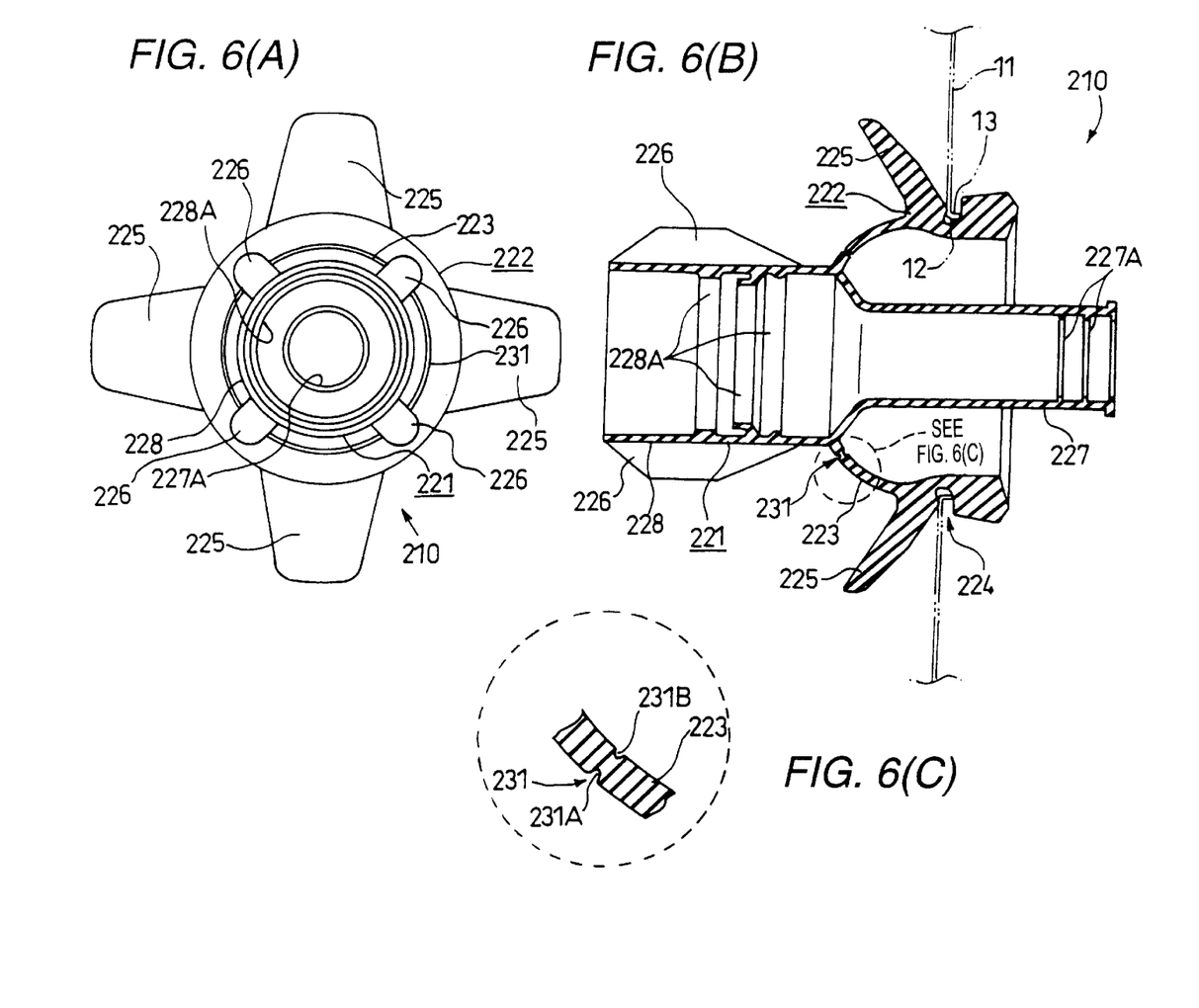
FIGS. 6A and 6B are a plan view and a cross-sectional view of a grommet according to a second embodiment of the invention.
Figure 7:
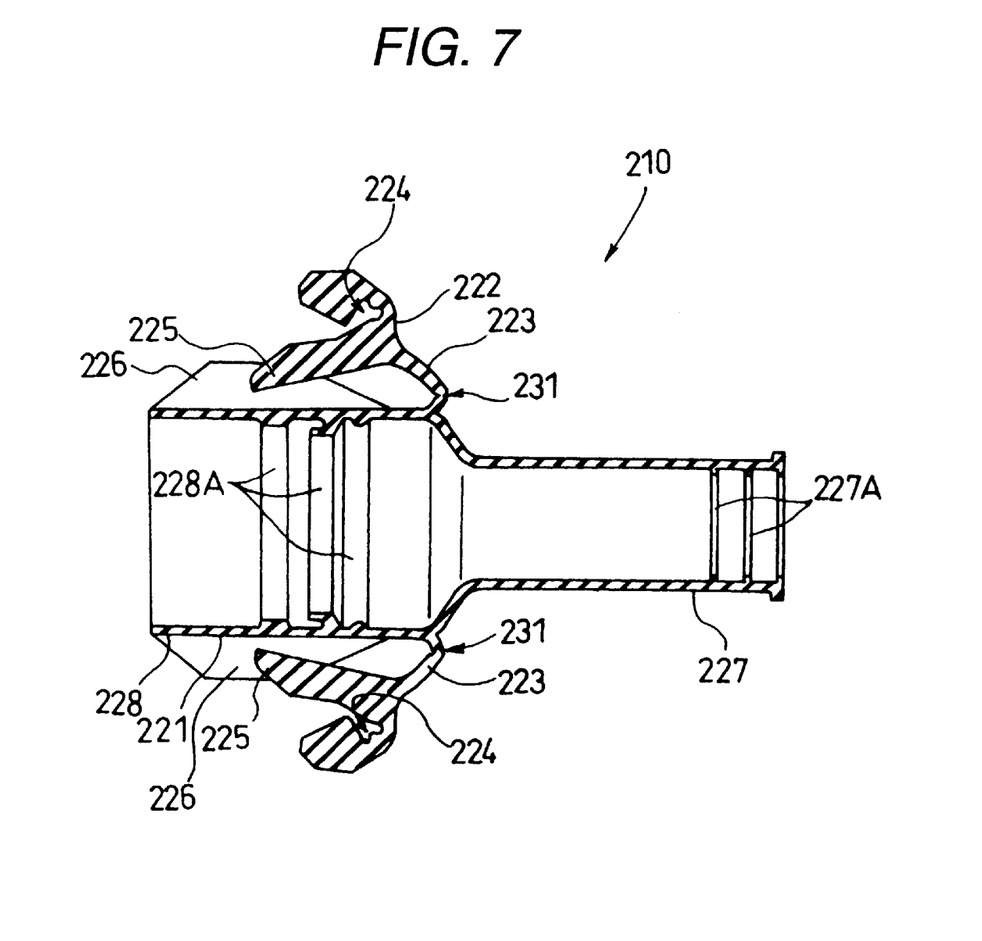
FIG. 7 is a cross-sectional view for the attachment processing performed with the grommet in FIG. 6.

FIGS. 6 and 7 are diagrams illustrating a grommet 210 according to a second embodiment of the invention. The same or like reference numerals used in FIGS. 1 to 5B are also used to denote corresponding or identical components in the following embodiments, and no further explanation for them will be given.

As in the first embodiment, the grommet 210 in the second embodiment comprises: a first cylinder 221, a connector 223, a second cylinder 222, a groove 224, flanges 225 and guide portions 226.

The grommet 210 in this embodiment differs from the first embodiment in that the faces of the flanges 225 are flat, and a thin wall portion 231 is formed for the connector 223.

As is shown in FIG. 6C, the thin wall portion 231 includes: grooves 231A and 231B, which are continuously, circumferentially formed in the inner face and the outer face of the connector 223.

The grooves 231A and 231B are shaped like semi-circles in cross section, and are formed along the face that is orthogonal to the axis of the connector 223, and at positions that correspond to each other.

In the grommet 210, because of the thin wall portion 231, the strength at a specific portion of the connector 223 is purposely lowered so it is less than that of the other portion. Thus, when the second cylinder 222 is everted to externally expose the inner face, the connector 223 is folded, with the thin wall portion 231 serving as a boundary (see FIG. 7).

At this time, the thin wall portion 231 is provided by using the grooves 231A and 231B formed along the face that is orthogonal to the axis of the connector 231. Therefore, the second cylinder 222 will not be everted relative to the first cylinder 221.

Since in the grommet 210 the strength of the thin wall portion 231 of the connector 223 is purposely reduced so that it is less than that of the other portion, the flexible reactive force for returning the connectors 223 to their original shapes is smaller than when the thin wall portion 231 is not formed for the connector 223.

That is, the grommet 210 can more preferably maintain the condition where the second cylinder 222 is everted than it can when the thin wall portion 231 is not formed for the connector 223. Thus, there is very little probability that the second cylinder 222 will unexpectedly return to its original shape, even as the result of an impact.

Therefore, the grommet 210 in the second embodiment can be shipped or stored, while the second cylinder 222 is appropriately everted relative to the first cylinder 221. Further, the everted condition of the second cylinder 222 can be maintained until the grommet 210 is attached to a body panel 11.

According to the grommet 210 for the second embodiment, especially since the thin wall portion 231 is provided by using the grooves 231A and 231B, the boundary of the connector 223 can be precisely determined, compared with when, for example, multiple recessed portions are formed at predetermined intervals around the circumference of the connector 223.

Figure 8:
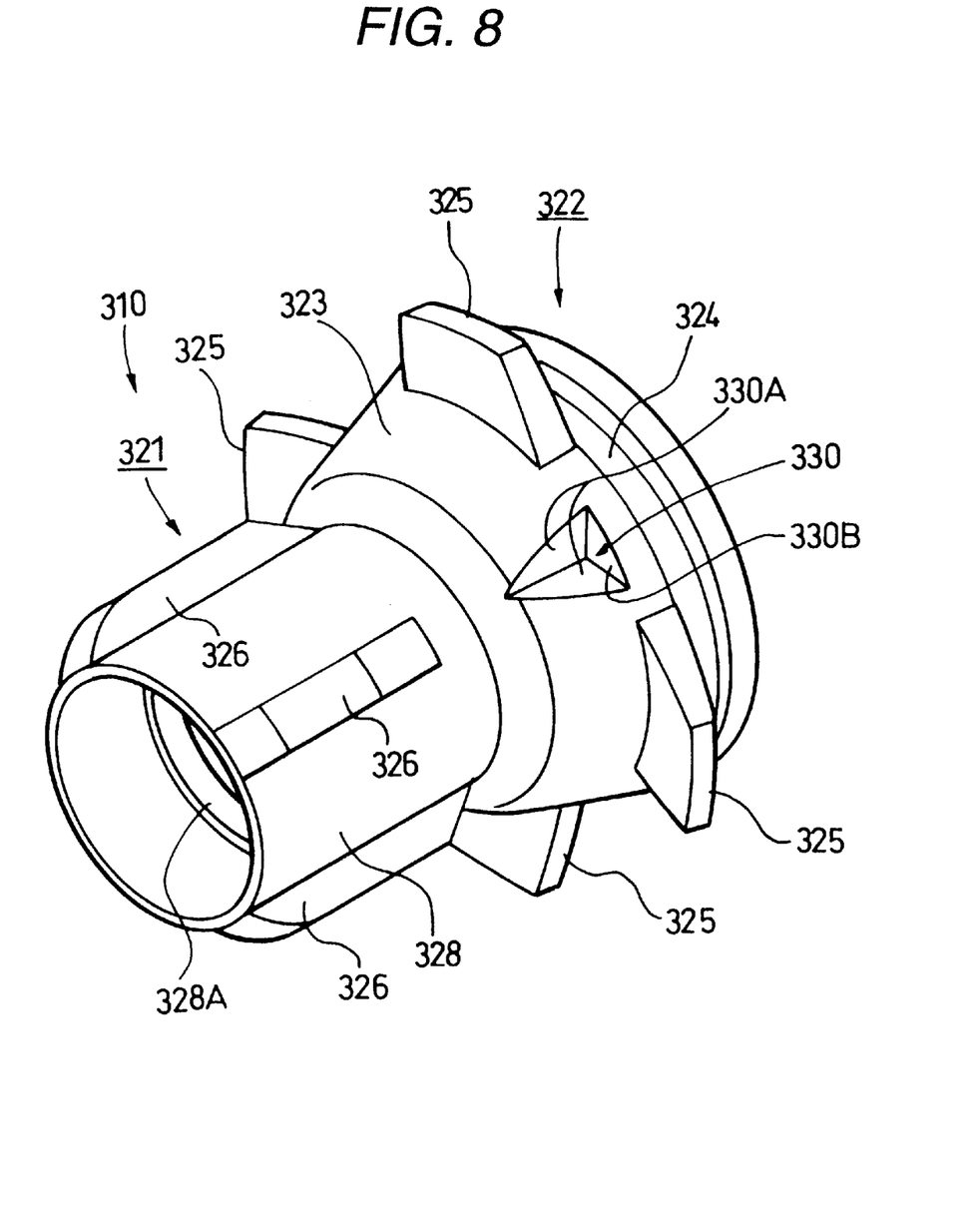
FIG. 8 is a perspective view of a grommet according to a third embodiment of the invention.
Figure 9:
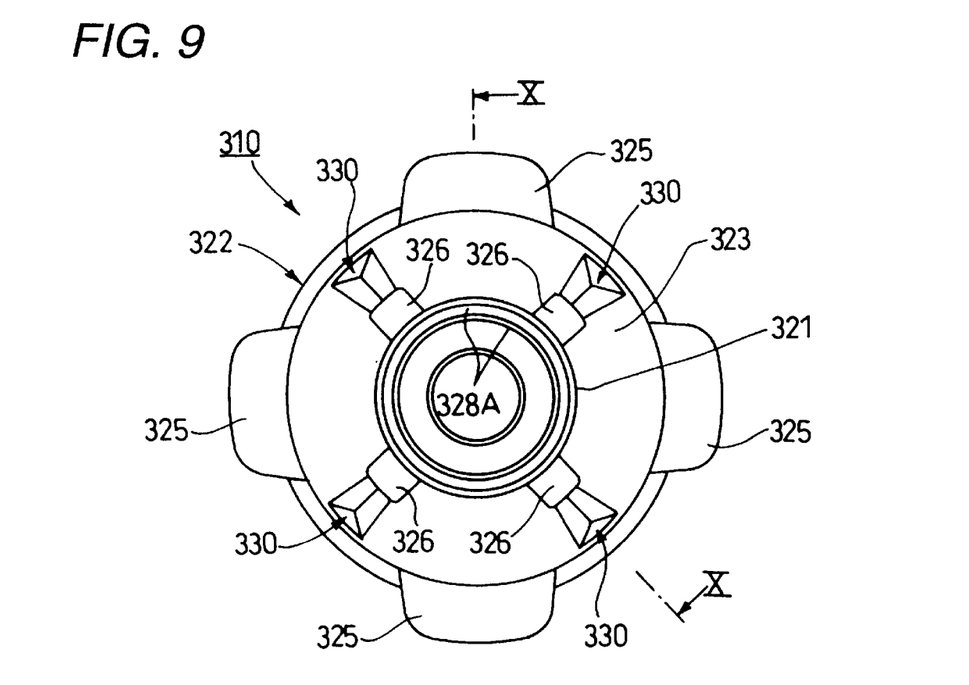
FIGS. 9 is a plan view of the grommet in FIG. 8.
Figure 10:
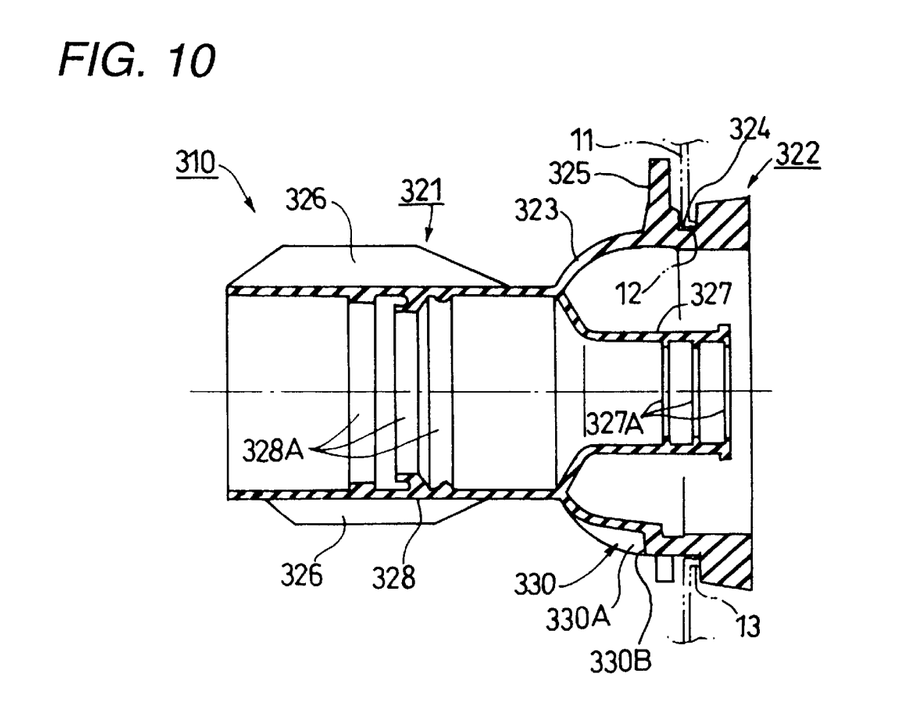
FIG. 10 is a cross-sectional view of the grommet in FIG. 8.

FIGS. 8 to 10 are diagrams illustrating a grommet 310 according to a third embodiment of the invention. The grommet 310, as in the first embodiment, comprises: a first cylinder 321, a connector 323, a second cylinder 322, a groove 324, flanges 325 and guide portions 326.

The grommet 310 of this embodiment differs from the first embodiment in that the faces of the flanges 325 are flat, and in that multiple recessed portions 330 are formed in the generatrix direction of the connector 323.

The recessed portions 330 are formed in a plane and have substantially rectangular shapes that open widely toward the second cylinder 322 from the generatrix of the connector 323. Each recessed portion 330 is given a substantially V shape in cross section by the alternate positioning of a pair of side walls 330A that have quarter-elliptical shapes, and a side wall 330B that is shaped like a fan.

In other words, the recessed portions 330 are so designed that their widths and depths are gradually reduced to 0 as you move toward the first cylinder 321.

As is shown in FIG. 9, the recessed portions 330 are positioned at the same phase as the guide portions 326 that are positioned relative to the axis of the first cylinder 321, and at intervals of 90 degrees around the axis of the first cylinder 321.

Further, as is shown in FIG. 10, there is a pointed projection on the inner face of the connector 323, so that the thickness of the portion whereat each recessed portion 330 is located is the same as the thickness of the other portions.

According to the grommet 310, multiple recessed portions 330 are formed in the generatrix direction of the connector 323. Thus, when the second cylinder 322 is everted, or the everted second cylinder 322 is returned to its original shape, a diameter-extending deformation occurs during which the connector 323 is partially extended by increasing the cross-sectional areas of the recessed portions.

Therefore, compared with when the outer face of the connector 323 is flat, the eversion of the second cylinder 322, or the return of the second cylinder 322 to its original shape can be easily performed.

Especially since the recessed portions 330 are placed at positions corresponding to the intervals between the flanges 325, the diameter-extending deformation can be further accelerated for a portion of the connector 323 that is little affected by the flanges 325, i.e., a portion of the connector 323 that circumferentially is easily extended.

Figure 11A:
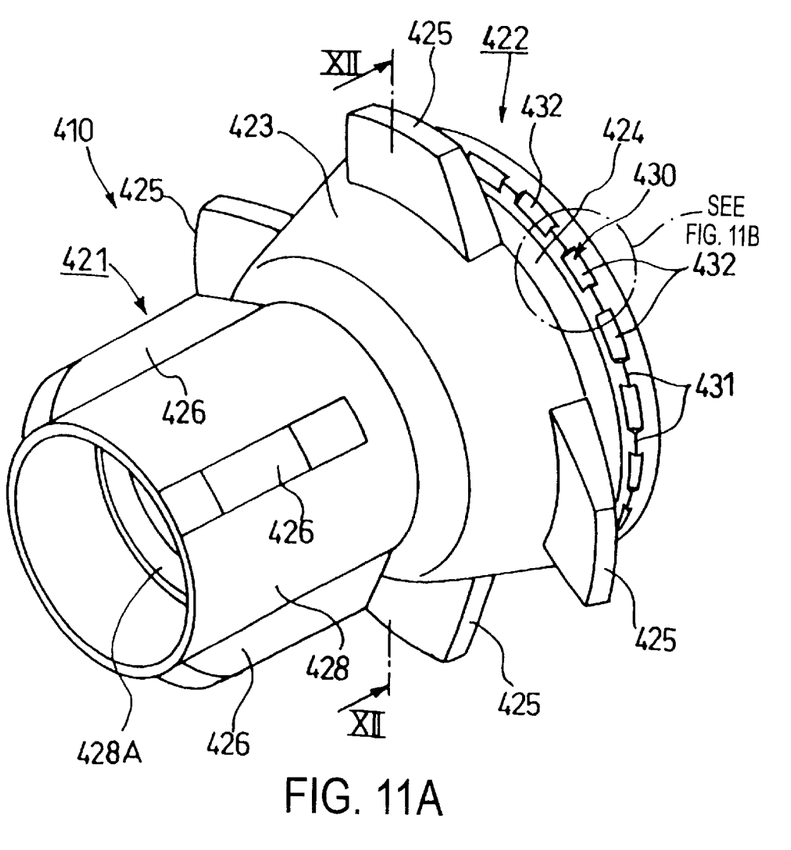
FIG. 11 is a perspective view of a grommet according to a fourth embodiment of the invention.
Figure 11B:
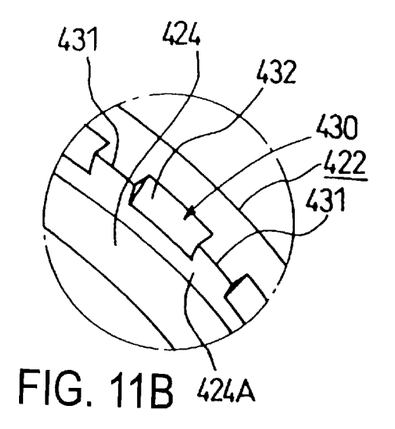
Figure 12:
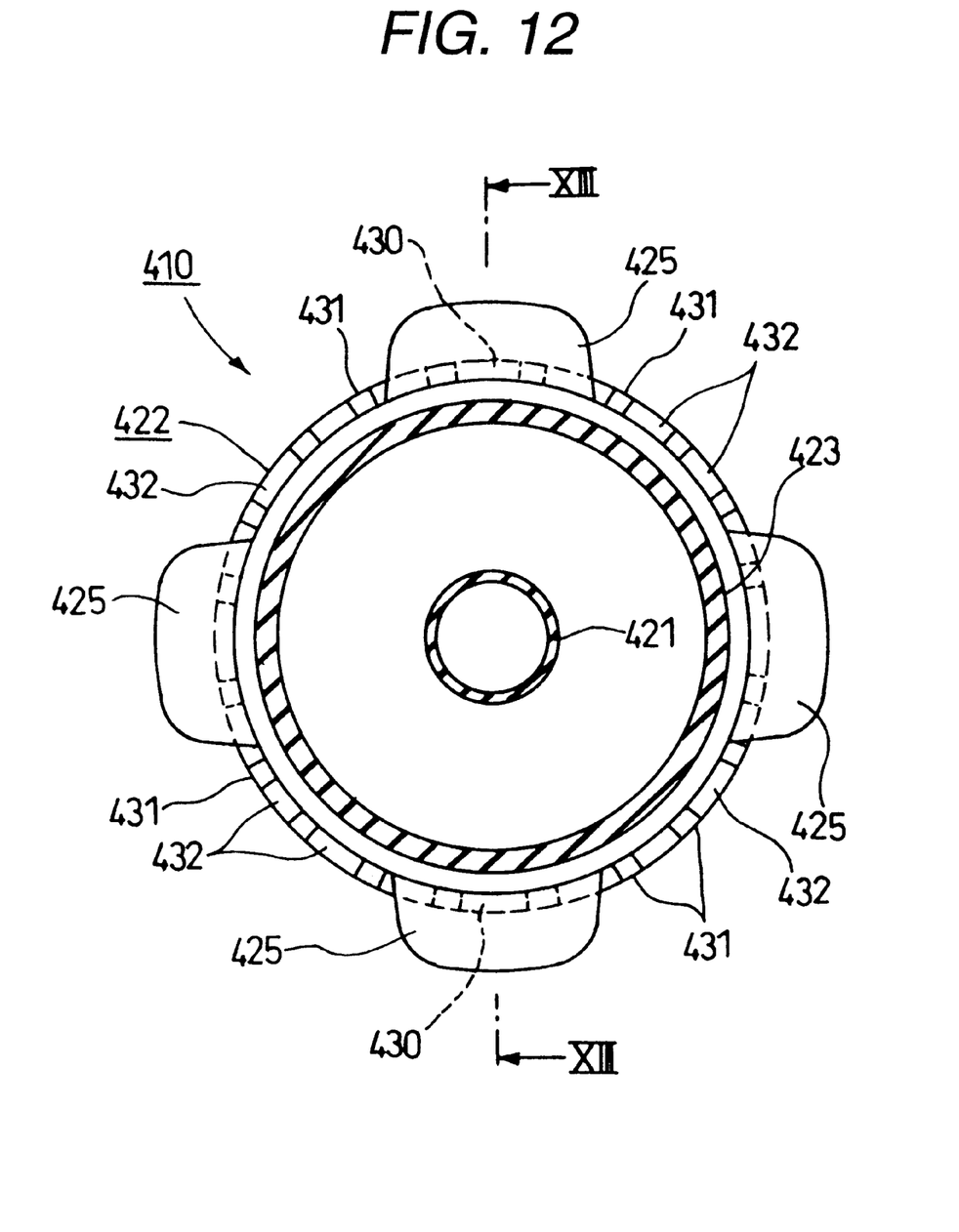
FIG. 12 is a cross-sectional view of the grommet in FIG. 11.
Figure 13:
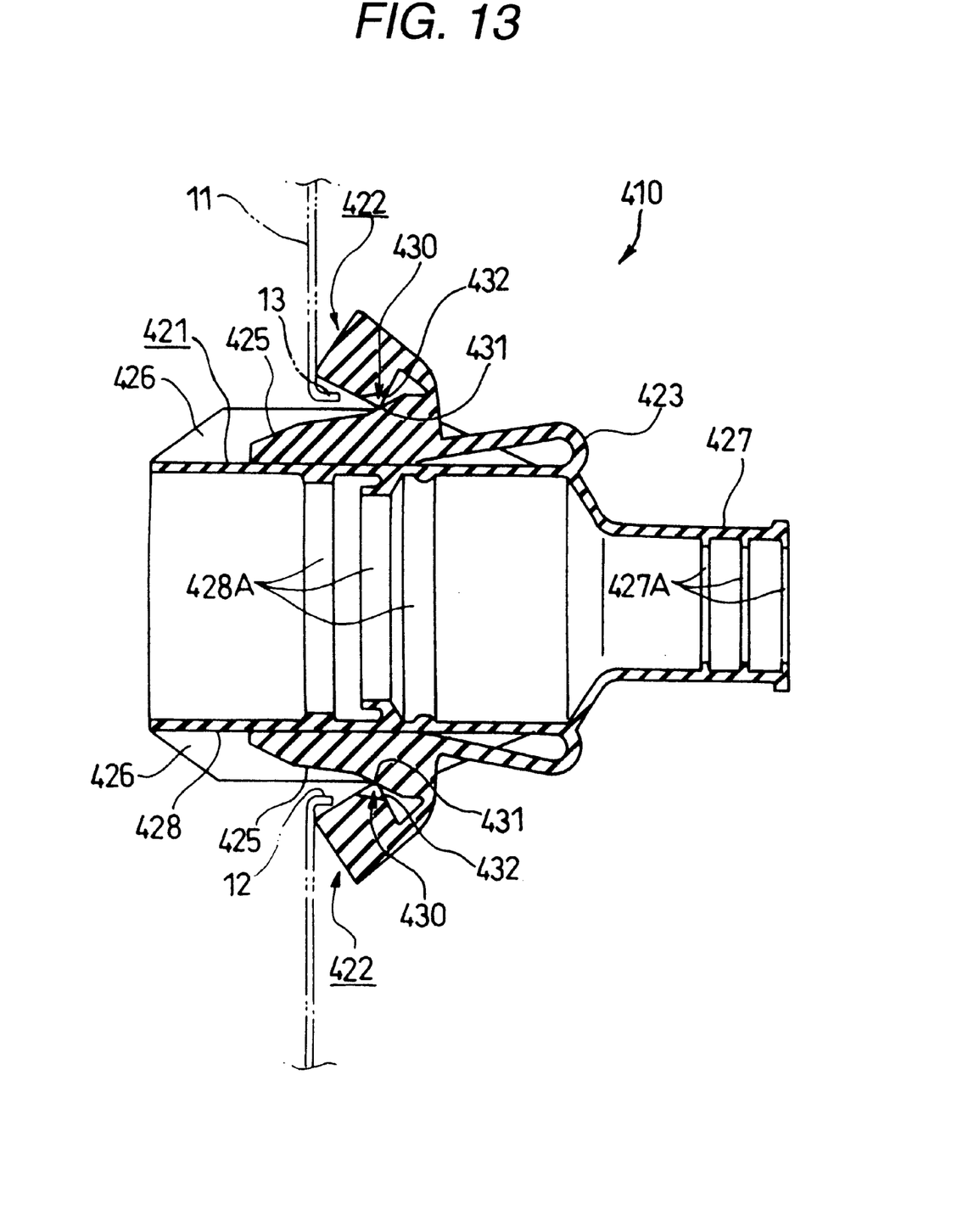
FIG. 13 is a cross-sectional view of the grommet in FIG. 11.

FIGS. 11 to 13 are diagrams illustrating a grommet 410 according to a fourth embodiment of the invention. The grommet 410, as in the first embodiment, comprises: a first cylinder 421, a connector 423, a second cylinder 422, a groove 424, flanges 425 and guide portions 426.

The grommet 410 in this embodiment differs from the first embodiment in that the faces of the flanges 425 are flat, and that projected corners 431 and notches 432 are formed at ridges 430 where the outer face of the second cylinder 422 intersects a side face 424A of the groove 424 that is directed toward the connector 423.

Each of the notches 432 is a conical face that intersects, at a predetermined angle, the side face 424A and the outer face of the second cylinder 422, and has a predetermined length that extends along the circumference of the second cylinder 422.

As is shown in FIG. 12, the projected corners 431 and the notches 432 have different circumferential lengths, and are alternately positioned along the circumference of the second cylinder 422.

Since the projected corners 431 and the notches 432 are formed along the ridges 430 of the groove 424, when the grommet 410 is shipped or stored with the second cylinder 422 everted, only the projected corners 431 at the ridges 430 are closely attached to the other, opposite ridges, even though the groove 424, which has a substantially U shape in cross section, is deformed and assumes a substantially rectangular shape in cross section and the ridges 430 are pressed against the other, opposite ridges. As a result, a gap is defined between the other ridges and the notches 432 (see FIG. 13).

That is, when the grommet 410 is to be attached to a body panel 11, compared with when no notches 432 are formed at the ridges 430 of the groove 424, the ridges of the grooves 424 are easily separated from each other, so that the recovery of the second cylinder 422 to its original shape can be easily effected.

The invention is not limited to these embodiments. The materials, the shapes, the sizes, the forms, and the numbers and the locations of the first cylinder, the connector, the second cylinder, the groove, the flanges, the guide portions, the ribs, the ridges, the slits, the thin wall portions, the recessed portions, the side faces, the projected corners and the notches are not limited to those in the embodiments, and can be arbitrary selected, so long as the invention can be implemented.

As is described above, according to the invention, as is described for the first aspect, when the second cylinder is everted, the flanges can be closely attached to the outer face of the first cylinder, without interfering with the guide portions. Thus, when the first cylinder is inserted into the mounting hole, the flanges that are gathered together like a cylinder can be inserted into the mounting hole while the axes are matched automatically.

Further, according to the second aspect of the invention, the flanges are projected along the conical face that opens widely toward the open end of the first cylinder. Thus, compared with when the flanges are projected along the same flat face that intersects the axis of the second cylinder, the flanges can be gathered together like a tapered cylinder without everting the second cylinder, and the space in an automobile body can be effectively employed.

According to the third aspect of the invention, the ribs formed on the flange faces of the flanges are continuously extended from the base ends of the flanges to the distal ends. Thus, compared with when the faces of the flanges are flat, the insertion resistance encountered when the tapered flanges are inserted into a mounting hole can be reduced. Further, when the second cylinder is returned to its original shape, the sliding resistance generated between the second cylinder and the flange faces can also be reduced.

In addition, according to the fourth aspect of the invention, a notch is formed between the outer face of the second cylinder and both ends of each rib formed on the flange faces. Thus, the resistance to deformation of the flanges is smaller than when the notches are not formed at the specified positions.

According to the fifth aspect of the invention, when the second cylinder is everted, the distal ends of the flanges can be arranged in a virtual cylinder that contacts the ridges. Thus, when the everted second cylinder is inserted into the mounting hole and is axially moved a predetermined distance, the flanges can be inserted into the mounting hole, while the axes are automatically matched.

According to the sixth aspect of the invention, multiple slits are formed axially from the radial positions at the open end of the inner face of the second cylinder, so that the slits are parallel and are continuously extended until they attain a predetermined length. Thus, a tension load, which is to be imposed across the entire inner face of the everted second cylinder, can, through the deformation of the slits, be dispersed to a plurality of specific portions. As a result, the total resistance to deformation can be reduced, and the second cylinder can be uniformly and easily everted.

According to the seventh aspect of the invention, thin wall portions are formed around the circumference of the connector. Thus, the second cylinder can be everted with the thin wall portions serving as boundaries, and compared with the conventional art, the probability that reversion of the connector will occur during shipping or storage can be reduced.

According to the eighth aspect of the invention, the thin wall portions are formed by using a groove that is continuously extended circumferentially. Thus, compared with when multiple recessed portions are formed along the circumference of the connector, the portion of the connector that serves as a boundary can be precisely determined.

According to the ninth aspect of the invention, multiple recessed portions are formed in the outer face of the connector. Thus, when the second cylinder is everted or when reversion of the everted second cylinder is effected, diameter-extending deformation occurs at a specific portion of the connector. As a result, less force is required to insert the connector into the mounting hole than is required when the outer face of the connector is flat.

According to the tenth aspect of the invention, recessed portions are formed at positions that correspond to those of the flanges. Thus, the diameter-extending deformation can be even more improved for a portion that is little affected by the flanges, i.e., a portion that is easily extended circumferentially.

According to the eleventh aspect of the invention, the projected corners and the notches are alternately formed along the ridges of the groove. Thus, when the grommet is shipped or stored with the second cylinder everted, only the projected corners of the ridges are closely attached to the other ridges, even though the groove, which has a substantially U shape in cross section, is deformed and assumes a substantially triangular shape in cross section. Thus, a gap can be obtained between the other ridges and the notches, so that the ridges of the groove can be easily separated.

What is claimed is:

1. A grommet comprising:
    a first cylinder through which an elongated member is to be inserted in order to retain said elongated member in a mounting hole that is formed in a mounting surface;
    a second cylinder connected via an annular connection provided on an outer face of said first cylinder;
    a groove formed along an outer face of said second cylinder; and
    a plurality of flanges that are formed radially, extending from a portion between said groove and said connection at said outer face of said second cylinder,
    a plurality of guide portions projecting outward radially from said outer face of said first cylinder, and inscribed in a circle formed by an inner edge of said mounting hole, when said second cylinder is everted, said flanges are closely attached to said outer face of said first cylinder, without interfering with said guide portions,
    wherein distal ends of said flanges are collectively tapered by everting said second cylinder so as to direct an inner face of said second cylinder toward the exterior, and are inserted into said mounting hole, and said first cylinder is inserted into said mounting hole by restoring the original shape of said second cylinder and said groove engages said inner edge of said mounting hole.

2. A grommet according to claim 1, wherein said flanges are projected around a conical face that is extended toward an open end of said first cylinder.

3. A grommet according to claim 1, wherein ribs are formed on faces of said flanges, and said ribs form continuous projections extending from bases of said flanges to distal ends of said flanges.

4. A grommet according to claim 3, further comprising:
    a notch formed between said ribs and said outer face of said second cylinder.

5. A grommet according to claim 1, wherein said guide portions are provided with ridges parallel to an axis of said first cylinder, when said second cylinder is everted, distal ends of said flanges are located inside a virtual cylinder that contacts said ridges.

6. A grommet according to claim 1, further comprising:
    a plurality of slits formed in said inner face of said second cylinder, said slits extending from radial positions at an open end of said second cylinder, parallel to an axis of said second cylinder, and continuing for a predetermined distance.

7. A grommet according to claim 1, further comprising:
    a thin wall portion circumferentially formed on one of an outer face and an inner face of said connection.

8. A grommet according to claim 7, wherein said thin wall is defined by a continuously circumferential groove.

9. A grommet according to claim 1, further comprising:
    a plurality of recessed portions formed radially toward a generatrix of an outer face of said connection,
    wherein said recessed portions open toward said second cylinder.

10. A grommet according to claim 9, wherein said recessed portions are formed at portions that correspond to said flanges.

11. A grommet according to claim 1, further comprising:
    projecting corners and notches provided along ridge lines formed by intersecting a side face of said groove that is directed toward said connection and said outer face of said second cylinder,
    wherein said projected corners and notches are alternately positioned around the circumference of said second cylinder.

* * * * *